United States Patent
Kermani

(10) Patent No.: US 6,526,128 B1
(45) Date of Patent: Feb. 25, 2003

(54) PARTIAL VOICE MESSAGE DELETION

(75) Inventor: Bahram Ghaffarzadeh Kermani, Whitehall, PA (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/263,074

(22) Filed: Mar. 8, 1999

(51) Int. Cl.⁷ ................................................ H04M 1/64
(52) U.S. Cl. ................................ 379/88.22; 379/88.08
(58) Field of Search ............................. 379/68, 76, 85, 379/88.07, 88.08, 88.09, 88.1, 88.11, 88.14, 88.22, 88.23, 88.24, 88.26, 88.28

(56) References Cited

U.S. PATENT DOCUMENTS

| | | | |
|---|---|---|---|
| 4,375,083 A | * 2/1983 | Maxemchuk | |
| 5,367,609 A | * 11/1994 | Hopper et al. | |
| 5,526,407 A | * 6/1996 | Russell et al. | |
| 5,664,060 A | * 9/1997 | Jarrett et al. | 704/270 |
| 5,675,709 A | * 10/1997 | Chiba | 704/278 |
| 5,699,089 A | * 12/1997 | Murray | 345/146 |
| 5,842,170 A | * 11/1998 | Daberko et al. | 704/278 |
| 5,875,448 A | * 2/1999 | Boys et al. | 707/531 |
| 5,889,838 A | * 3/1999 | Miura | 379/67.1 |
| 5,943,402 A | * 8/1999 | Hamel et al. | 379/88.26 |
| 6,041,227 A | * 3/2000 | Sumner | 455/412 |
| 6,205,419 B1 | * 3/2001 | Fiedler | 704/201 |
| 6,240,299 B1 | * 5/2001 | Song | 455/413 X |

FOREIGN PATENT DOCUMENTS

| | | | | |
|---|---|---|---|---|
| DE | 3806134 | * | 9/1989 | 379/68 |
| JP | 0016162 | * | 1/1989 | 379/68 |
| JP | 0205157 | * | 8/1990 | 379/68 |
| JP | 0217053 | * | 8/1990 | 379/68 |
| JP | 0305258 | * | 12/1990 | 379/68 |

\* cited by examiner

Primary Examiner—Scott L. Weaver
(74) Attorney, Agent, or Firm—William H. Bollman

(57) ABSTRACT

Apparatus and processes to allow a user of a voice messaging system such as a telephone answering device to delete only selected portions of a recorded voice message and/or to save only selected portions of a recorded voice message. A recorded voice message is marked and delineated into separate portions, e.g., at predetermined time intervals, at intermittent time intervals, at random time intervals, at content-silent or quiet points based on content of the underlying voice message, etc. The marked portions of the voice message can be selectively deleted or saved from the voice message leaving a reduced length and thus efficient voice message remaining in voice message memory. The portions of the recorded voice message may be deleted or saved either before, during, or after playback of the relevant portions of the recorded voice message.

21 Claims, 11 Drawing Sheets

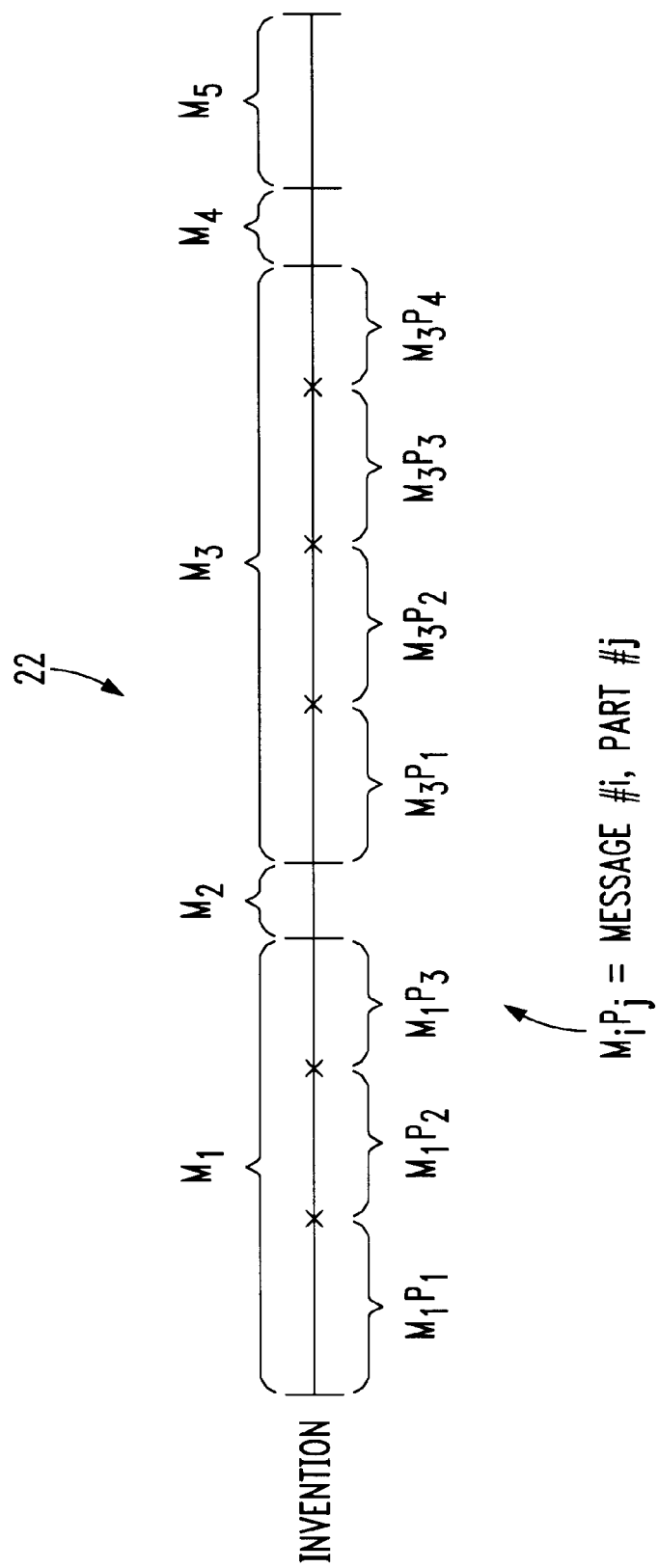

FIG. 2C
MESSAGE TABLE SECTOR
200

| | |
|---|---|
| TIME/DATE | —802 |
| TAG | —804 |
| CODER | —806 |
| NEW/OLD | —808 |
| DELETED/PARTIAL DELETED/NON-DELETED | —210 |
| # BYTES IN LAST SECTOR | —812 |
| LINK LIST | —814 |
| ETC. | —816 |
| | |

FIG. 8
MESSAGE TABLE SECTOR
PRIOR ART
800

| | |
|---|---|
| 802 | TIME/DATE |
| 804 | TAG |
| 806 | CODER |
| 808 | NEW/OLD |
| 810 | DELETED/NON-DELETED |
| 812 | # BYTES IN LAST SECTOR |
| 814 | LINK LIST |
| 816 | ETC. |

FIG. 9
SPEECH DATA SECTOR
PRIOR ART
900

| | | | |
|---|---|---|---|
| 902 | ENCODED SPEECH DATA | 0 | (0) |
| 904 | ENCODED SPEECH DATA | 1 | |
| 906 | ENCODED SPEECH DATA | 2 | |
| | ⋮ | ⋮ | |
| 908 | ENCODED SPEECH DATA | 127 | (7F) |

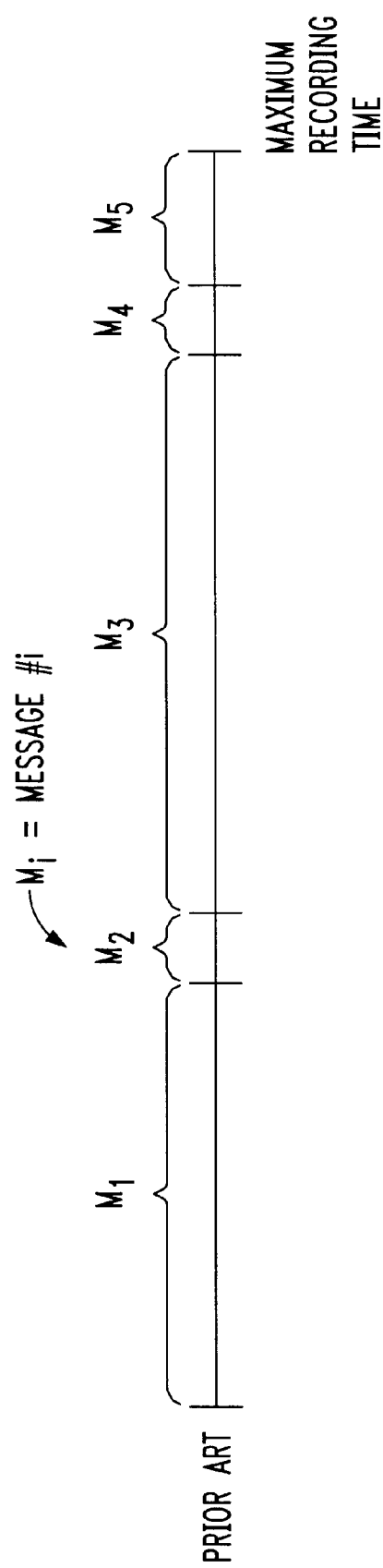

PARTIAL VOICE MESSAGE DELETION

BACKGROUND OF THE INVENTION

1. Field of the Invention

This invention relates generally to voice messaging systems. More particularly, it relates to a telephone answering device capable of allowing a user to delete selected portions of a recorded voice message.

2. Background of Related Art

Voice messaging systems in general, and telephone answering devices (i.e., answering machines) in particular, are useful devices for the home or office. A conventional telephone answering device operates on a single telephone line and answers an incoming call to an unused (i.e., on-hook) or even busy telephone after a desired number of rings. The telephone answering device causes the telephone line to enter an off-hook condition, then plays an outgoing greeting message to the calling party. After the outgoing greeting message, the calling party may leave a voice message on the telephone answering device. At a later time, the voice message is replayed by the user, either local to the telephone answering device or via remote connection from another telephone.

Furthermore, voice messaging in telephony has been greatly advanced in recent years by the inclusion of digital information associated with a voice message. In fact, answering or voice messaging machine designs have further benefited from the decreasing costs of non-volatile memory to the point at which digital answering machines and electronic voice mail systems are affordable and common. In these types of voice messaging systems, speech data is stored digitally, i.e., in non-volatile or volatile-with-refresh memory rather than on a magnetic tape as in older messaging machines.

FIG. 7 illustrates a conventional telephone answering device capable of answering and recording a voice message from an incoming call on a telephone line.

In particular, in FIG. 7, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The controller 19 is typically a suitable microprocessor, microcontroller, or digital signal processor (DSP). The ring detect signal indicates to the controller 19 the ringing of an incoming telephone call on the telephone line 15.

After a desired number of ring signals, the telephone answering device 11 causes the telephone line interface 17 to place the telephone line in an off-hook state, and instructs a voice recorder/playback module 21 to play a pre-recorded outgoing greeting message over the telephone line 15 to the calling party. Upon completion of the outgoing greeting message, the calling party may leave a voice message in voice message memory 23 under the control of the controller 19.

A user of the telephone answering device 11 later retrieves the recorded voice message from the voice message memory, using the keypad 25 or other buttons or controls for selecting various modes of operation, and then deletes the voice message if desired. When deleted, the entire voice message is effectively erased from the voice message memory 23 (e.g., by allowing new voice messages to overwrite all portions of the deleted voice message).

FIG. 8 illustrates an exemplary voice message table 800 contained in one sector of the voice message memory 23. The message table 800 contains various header information relating to an underlying voice message stored in the same or linked page of voice message memory 23. Conventional header type information includes a time/date stamp 802 indicating the time and date when an underlying speech message was stored. TAG information 804 in the header contains user defined data. Typically, to maximize efficiency in the conventional digital answering machine 11, the speech data is encoded. Thus, the header includes coder information 806 identifying the type of encoding used to encode the underlying voice message data, e.g., the particular coded data rate. The new/old information 808 entry in the header of the message table 800 relates to whether or not the underlying speech message has been reviewed at least once by the user of the digital answering machine 11. The deleted/non-deleted information 810 in the header conventionally indicates whether or not the underlying voice message has been deleted by the user. The number of bytes in the last sector information 812 relates to the length of the voice message in the last sector in which the voice message is stored, avoiding replay of the unused end portion of a partially used last sector when replaying the relevant voice message. Link list information 814 in the header indicates the addresses of all sectors used to store the relevant voice message. Of course, additional header information 816 may typically be included in the message table 800.

FIG. 9 shows an exemplary sector in the voice message memory 23 containing the underlying voice message 902–908. The sector shown in FIG. 8 is the first listed in the link list 814 of the message table 800 for the underlying voice message. Zero, one or more pages of speech data 902–908 may be listed in the link list 814 of a message table 800 for a single voice message.

Unfortunately, there is limited space in the voice message memory 23 to store voice messages on a conventional telephone answering device 11. As indicated in FIG. 10, once the maximum recording time has been reached, the telephone answering device 11 will not be able to accept and record any additional voice messages. The user of the conventional telephone answering device will be required to delete or erase an entire message from the voice message memory 23 in order to receive and record additional voice messages.

Moreover, a user of a voice messaging system may occasionally receive a very long voice message. In such a case, the user may be interested in only a small portion of the very long voice message, e.g., the end portion containing a call-back telephone number. Oftentimes, a user needs to hear the general content of the voice message only once, but may not be prepared for writing down detailed information at the end, e.g., a telephone number, contact name, or an address. Using conventional telephone answering systems, the entire voice message must be retained until played back later when the user is prepared to transcribe the detailed information. Unfortunately, the retained lengthy voice message will occupy valuable memory in the limited voice message memory 23.

Accordingly, there exists a need for a method and apparatus allowing more efficient use of voice memory to provide additional capacity to store additional voice messages.

SUMMARY OF THE INVENTION

In accordance with the principles of the present invention, a deletion control module for a voice messaging system comprises a marker module adapted to delineate a recorded voice message into a plurality of portions. A selective deletion/save voice message module acts upon selected delineated portion of the recorded voice message, and leaves intact at least one undeleted portion of the recorded voice message for subsequent abbreviated playback of the recorded voice message.

A method of deleting only a portion of a recorded voice message in a voice messaging system in accordance with another aspect of the present invention comprises delineating a recorded voice message into a plurality of portions. At least one but not all of the plurality of portions of the recorded voice message are deleted.

BRIEF DESCRIPTION OF THE DRAWINGS

Features and advantages of the present invention will become apparent to those skilled in the art from the following description with reference to the drawings, in which:

FIG. 2a illustrates exemplary contents of voice message memory in the telephone answering device of FIG. 1 subsequent to the marking of passages within the voice messages, in accordance with the principles of the present invention.

FIG. 2c illustrates a sector of voice memory containing a message table in an exemplary embodiment of the telephone answering device, constructed in accordance with the principles of the present invention.

FIG. 8 illustrates a conventional sector of memory containing a conventional voice message table in the conventional telephone answering device illustrated in FIG. 7.

FIG. 9 illustrates a conventional sector of memory containing conventional speech data in the conventional telephone answering device illustrated in FIG. 7.

FIG. 10 illustrates exemplary contents of voice message memory of the conventional telephone answering device illustrated in FIG. 7.

DETAILED DESCRIPTION OF ILLUSTRATIVE EMBODIMENTS

The present invention provides a voice messaging system, which allows a user to delete only selected portions of a recorded voice message, retaining the remainder of the voice message in voice message memory for later playback.

In accordance with the principles of the present invention, the user may delete one or more selected portions of a recorded voice message at any suitable time, e.g., after playing back a particular portion of the recorded voice message, while playing back the recorded voice message, before playing back the recorded voice message, and/or after playing back the recorded voice message in its entirety.

Although the present invention is shown embodied in a telephone answering device, the present invention is equally applicable to voice messaging systems in general, electronic voice mail systems, or any other memory system which associates and stores speech-related data.

Figure 1:
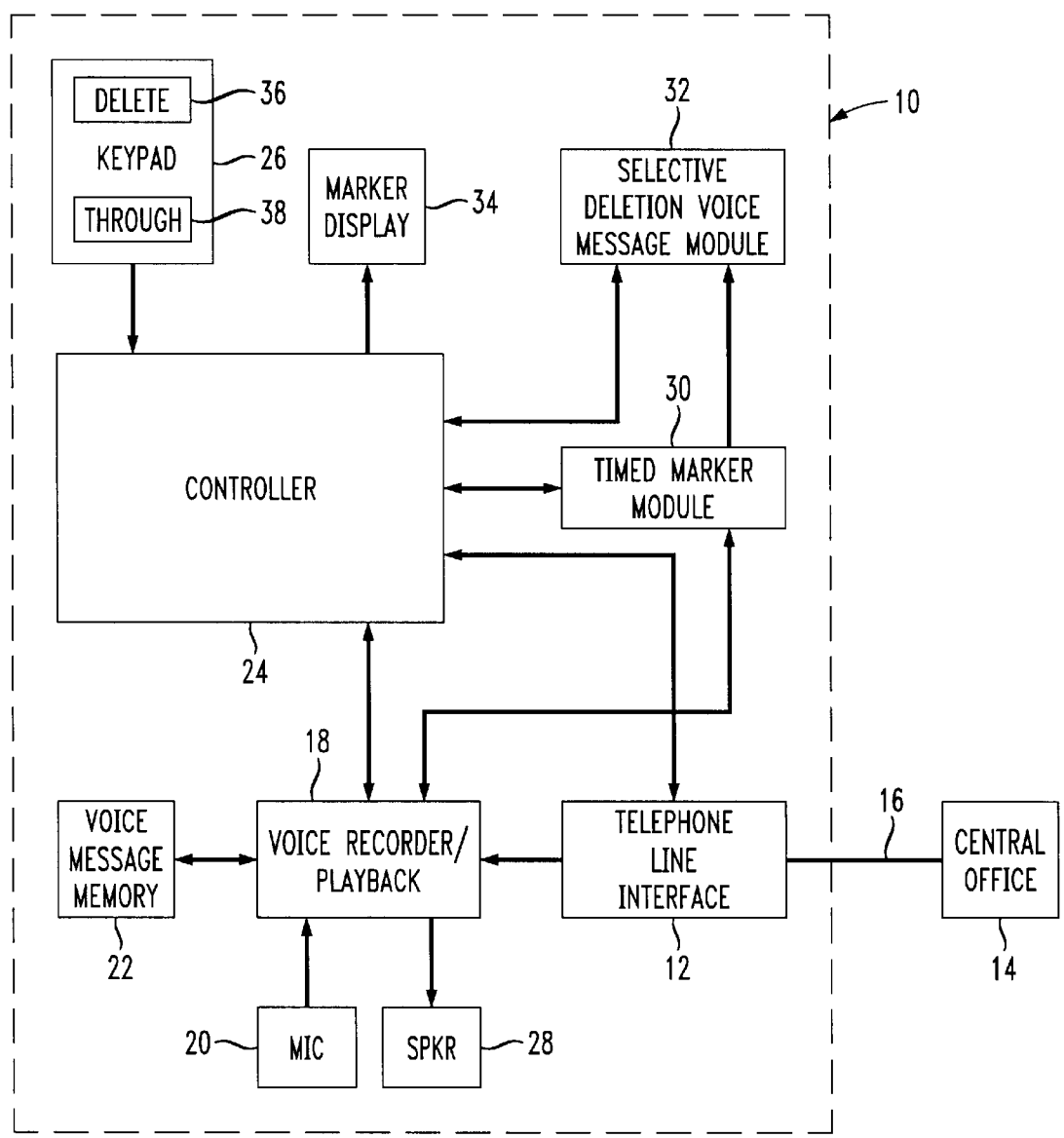
FIG. 1 illustrates a telephone answering device which allows a calling party to record a voice message, and which allows a user to delete only a portion of a recorded voice message, in accordance with the principles of the present invention.

FIG. 1 illustrates a telephone answering device, indicated generally at 10, capable of allowing a user to delete selected portions of a recorded voice message, in accordance with the principles of the present invention.

In particular, the telephone answering device 10 includes a telephone line interface 12 for interconnection with a telephone company central office 14 via a telephone line 16. The telephone line interface 12 interconnects the telephone line 16 with a voice recorder/playback module 18. The voice recorder/playback module 18 includes a microphone 20 for recording local messages and/or for recording a personalized outgoing greeting message. Recorded voice messages are stored in voice message memory 22, and are played back by the voice recorder/playback module 18 through a speaker 28 or similar device. The voice message memory 22 may be any suitable memory, preferably non-volatile memory, e.g., Flash memory.

The telephone answering device 10 includes a controller 24 to control the overall functionality of the telephone system 10. The controller 24 may be any suitable processor, e.g. a microprocessor, a digital signal processor (DSP), or a microcontroller. A keypad 26 and/or other buttons and controls allow a user to select various modes of operation, including the retrieval and playback of voice messages from the voice message memory 22.

The telephone answering device 10 further includes a timed marker 30, a selective deletion voice message module 32, a marker display 34, and a keypad 26.

The timed marker module 30 outputs a marker signal at, e.g., predetermined time intervals to the controller 24, to the selective deletion voice message module 32, and to the voice recorder/playback module 18.

The selective deletion voice message module 332 selectively deletes portions of a recorded voice message in response to partitions indicated by the timed marker module 30, and in response to signals from the controller 24.

The optional marker display module 34 displays visual cues identifying specific partitions existing, deleted, and/or saved in the recorded voice message, in response to signals from the controller 24.

Of course, the modules shown in FIG. 1 can be implemented as shown in FIG. 1, or within software implemented within the controller 24.

In the disclosed embodiment, partitions for selected deleted portions of recorded voice messages are demarcated or marked using audible and/or visible periodic or intermittent markers, e.g., output through the speaker 28 by a timed marker module 30 and/or a marker display 34. In accordance with the principles of the present invention, the user selects for deletion marked portions or sections of a recorded voice message, e.g., marked in accordance with a playback timing of the voice message.

In operation, the telephone answering device 10 allows a calling party to record a voice message as in a conventional telephone answering device. For instance, after a desired number of ring signals, the telephone answering device 10 causes the telephone line interface 12 to place the telephone line 16 in an off-hook state, and instructs the voice recorder/playback module 18 to play an outgoing greeting message on the telephone line 16 to the calling party. The recorded outgoing greeting message may be a standardized greeting message stored in the voice message memory 22 by a manufacturer, and/or personally recorded in the voice message memory 22 or other suitable storage device.

After the outgoing greeting message is played (or bypassed in accordance with conventional techniques, e.g., by pressing "#" on the calling party's telephone), the calling party is allowed to record a voice message in the voice message memory 22 under the control of the controller 24.

Importantly, the telephone answering device 10 illustrated in FIG. 1 further includes a timed marker module 30 and a selective deletion/save voice message module 32. The timed marker module 30 audibly generates and outputs a timed marker signal at timed intervals within the voice message recorded on the telephone answering device 10 by the calling party dividing the voice message into marked passages, as illustrated in FIG. 2a. The timed intervals for the timed markers can be at any predetermined time rate, e.g., every ten (10) seconds, every minute, etc. While the timed marker has been heretofore described as being an audible signal, it is within the scope of the present invention to have the timed marker be a visual marker, e.g., as displayed on the marker display 34 of the telephone answering device 10.

The timed marker module 30 according to the present invention outputs a signal at a predetermined time intervals and converts the signal into an audible signal output by the speaker connected to the voice recorder/playback module 18 and the speaker 28 and/or a visual signal displayed on the marker display 34.

The timed markers divide the voice message into marked passages, as illustrated in FIG. 2a. The markers may be intermittently output in relation to the playback of the recorded voice message, i.e., at unequal time intervals. Alternatively, the markers may be output with random intervals. Furthermore, the markers may be placed at boundaries corresponding to points in the voice message falling between memory blocks, e.g., memory sectors, to allow easy deletion and re-indexing of the remaining memory sectors for later playback of what remains of the relevant voice message.

Moreover, the timed markers may be output or placed based on particular content of the voice message rather than on a time basis. Thus, for instance, a marker may be placed in any/all silence periods in a recorded voice message. The silence periods may be determined as points wherein voice content or energy is substantially below a predetermined 'silence' floor level for a predetermined period of time, e.g., for at least one (1) second. The content of the recorded voice messages may be determined during playback of the relevant voice message through analysis performed in the selective deletion voice message module 32 and/or controller 24.

The selective deletion voice message module 32 allows the user to selectively delete certain delineated portions of a recorded voice, message. The selective deletion voice message module 32 is preferably a software module included within the program code of the controller 24. Of course, the selective deletion voice message module 32 can be implemented separate from the controller 24, but regardless, will preferably be in communication with the controller 24.

The selective deletion voice message module 32 can be activated by the user of the telephone answering device 10 via suitable input into the keypad 26, e.g., using a dedicated "activate markers" button or similar function. Alternatively, the generation of markers can be activated by the controller 24 after recognition of a particular code keyed into an alphanumeric portion of the keypad 26.

To prevent accidental or unauthorized deletion of certain marked passages of a voice message, a security codes can be made to be required from the user prior to the deletion of any portions of any voice message.

A user can select particular portions of a recorded voice message for deletion by suitable control input to the selective deletion voice message module 32. To delete a selected portion, a user will activate buttons on the keypad 26 corresponding to the appropriate portion(s) of a recorded voice message to be deleted. For instance, to delete the twenty-third marked portion of a particular recorded voice message, the user may input the command sequence "2", "3", "delete", wherein the "2" and "3" relate to alphanumeric buttons on the keypad 26, and the "delete" relates to activation of the delete button 36 shown in FIG. 1.

Figure 2B:
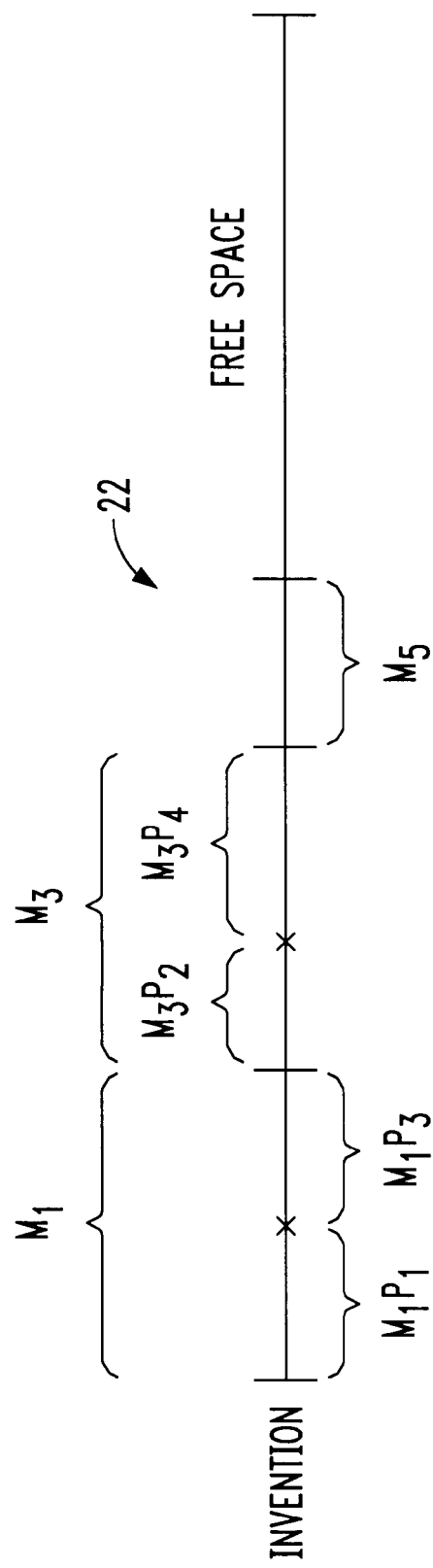
FIG. 2b illustrates exemplary contents of voice message memory in the telephone answering device of FIG. 1 after the user has deleted certain portions of one or more voice messages, in accordance with the principles of the present invention.

FIGS. 2a and 2b illustrates exemplary contents of the voice message memory 22 before (FIG. 2a) and after (FIG. 2b) a user of the telephone answering device 10 has deleted certain marked passages of a number of voice messages stored in the voice message memory 22.

In particular, FIG. 2a shows five messages m1 to m5 stored in the voice message memory 22. When played back, the first message m1 becomes partitioned into three portions m1p1, m1p2, m1p3 (e.g., of equal length in the disclosed example). Similarly, the third message m3 becomes partitioned into four portions m3p1, m3p2, m3p3, m3p4. The second, fourth and fifth messages m2, m4, m5 are either too short to have partitions associated therewith, and/or have not yet been replayed by the user.

After playback and suitable deletion of unnecessary portions of the respective voice messages, the first voice message m1 has been reduced in length to contain only the first and last portions m1p1, m1p3, the second voice message has been deleted entirely m2, the third voice message m3 has been reduced to contain only the third and fourth partitions m3p3, m3p4, the fourth voice message has been deleted entirely, and the fifth voice message has either been saved or has not yet been played back. Note the additional free space created at least in part by the deletion of portions of the first and third voice messages m1, m3.

Deletion of certain marked passages of voice messages provides free space for additional voice messages to be stored within the voice message memory 22 while at the same time maintaining important portions of older voice messages until the user has the ability to utilize and then delete the remaining retained portion.

FIG. 2c illustrates an exemplary sector of voice memory containing an updated message table in an exemplary embodiment of the telephone answering device, constructed in accordance with the principles of the present invention.

In particular, the new/old portion 808 may indicate that the underlying voice message has been played back at least once. What was simply a deleted/non-deleted indication 810 in the conventional system as shown in FIG. 8 may be updated to indicate a partial deletion of the underlying voice message 210. Moreover, the link list 814 will be updated accordingly to no longer include the memory sectors corresponding to deleted portions of the underlying voice message.

Certain quick delete or multiple delete options can be implemented in the selective deletion voice message module 32. For instance, a button or control sequence can be implemented for recognition by the controller 24 and activation by the selective deletion voice message module 32 to delete predetermined portions of a recorded voice message, e.g., based on an amount of time previous or hence, a number of partitions previous or hence, etc.

As an example, a button can be implemented which causes the selective deletion voice message module 32 to effectively delete, e.g., the "last 10 seconds" or the "next 10 seconds" of a voice message being played back. Similarly, a button can be prearranged to cause deletion of, e.g., the "last 10 marked partitions" or the "next 10 marked partitions" of a voice message. A button or control sequence may be implemented to delete "all previous portions" or "all remaining portions" of a voice message based on a particular time during the playback at which the button is activated.

Figure 3:
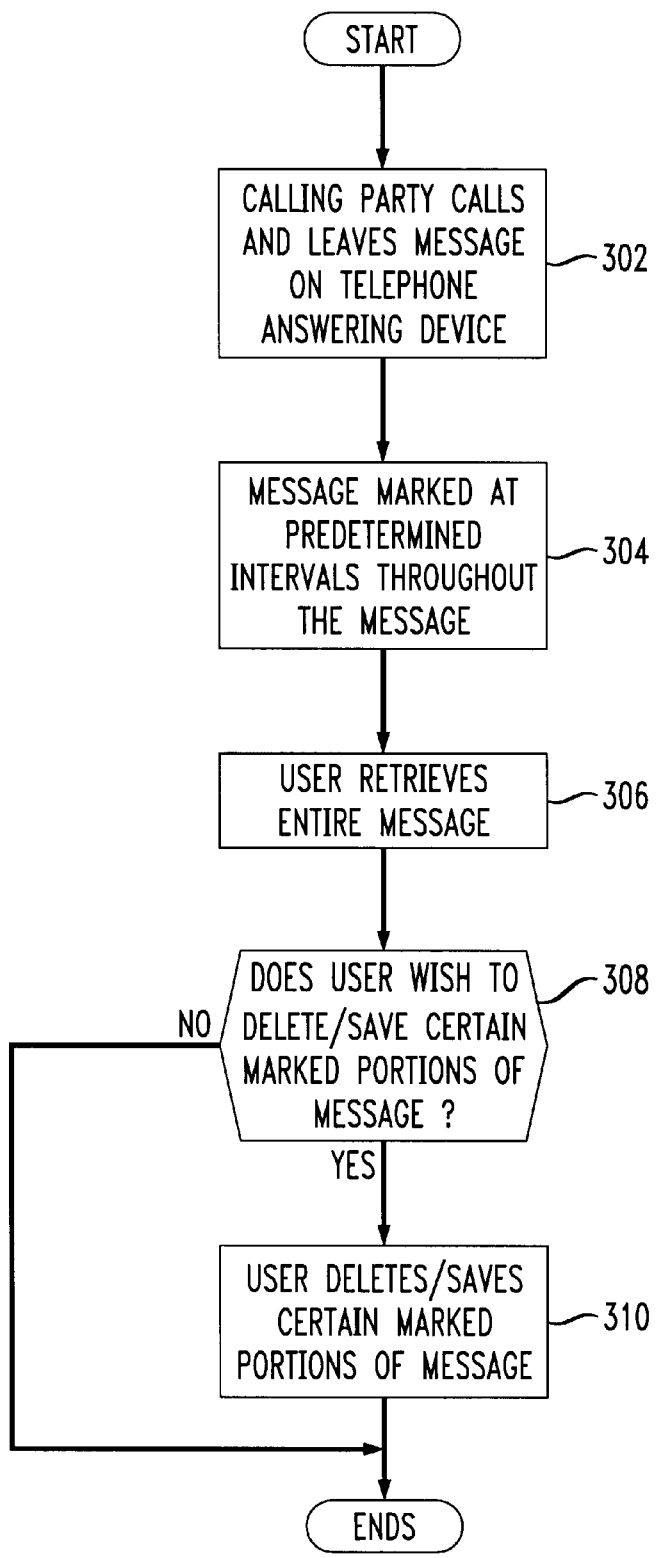
FIG. 3 is a flow chart illustrating an exemplary process by which the telephone answering device of FIG. 1, in accordance with the principles of the present invention, allows a user to delete only portions of a voice message after playback of the voice message.
Figure 4:
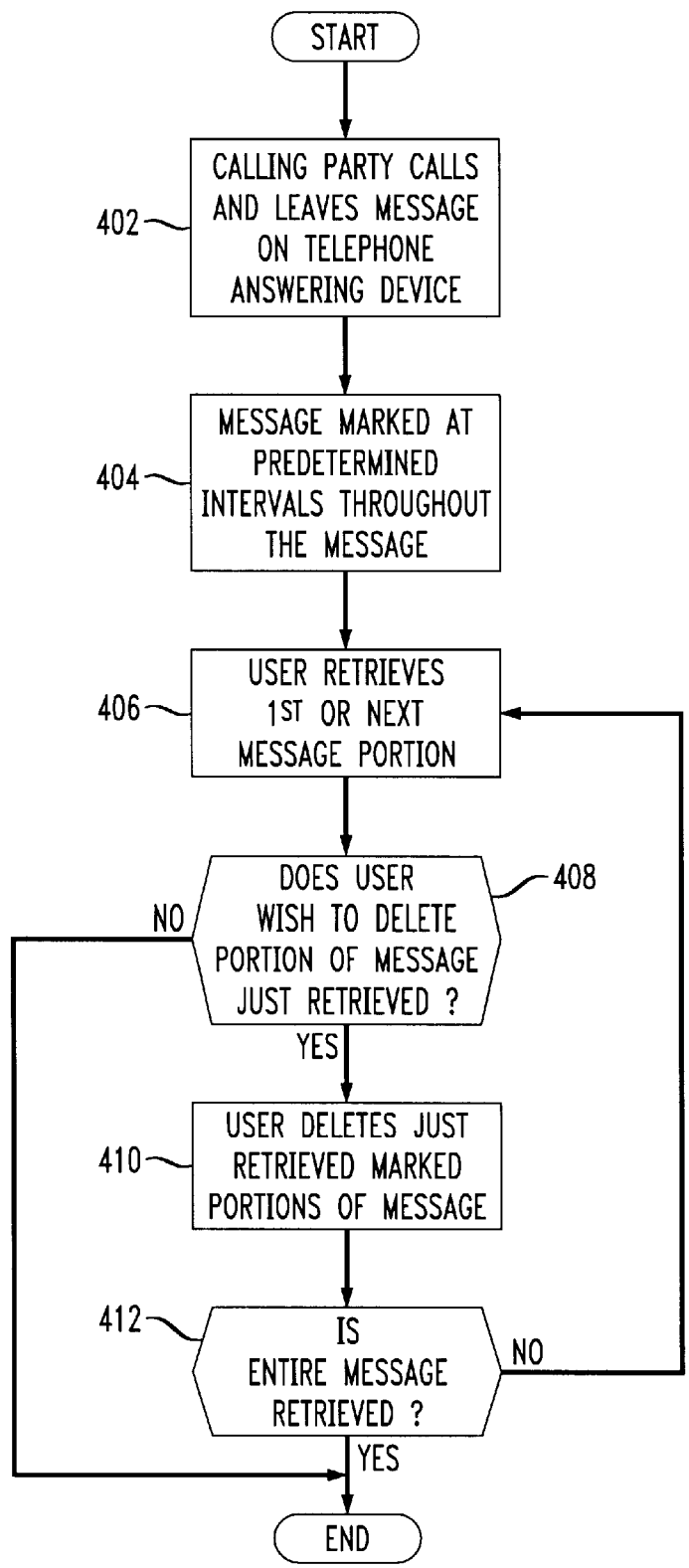
FIG. 4 is a flow chart illustrating an exemplary process by which the telephone answering device of FIG. 1, in accordance with the principles of the present invention, allows a user to delete only portions of a voice message after playback of just a portion of the voice message.
Figure 5:
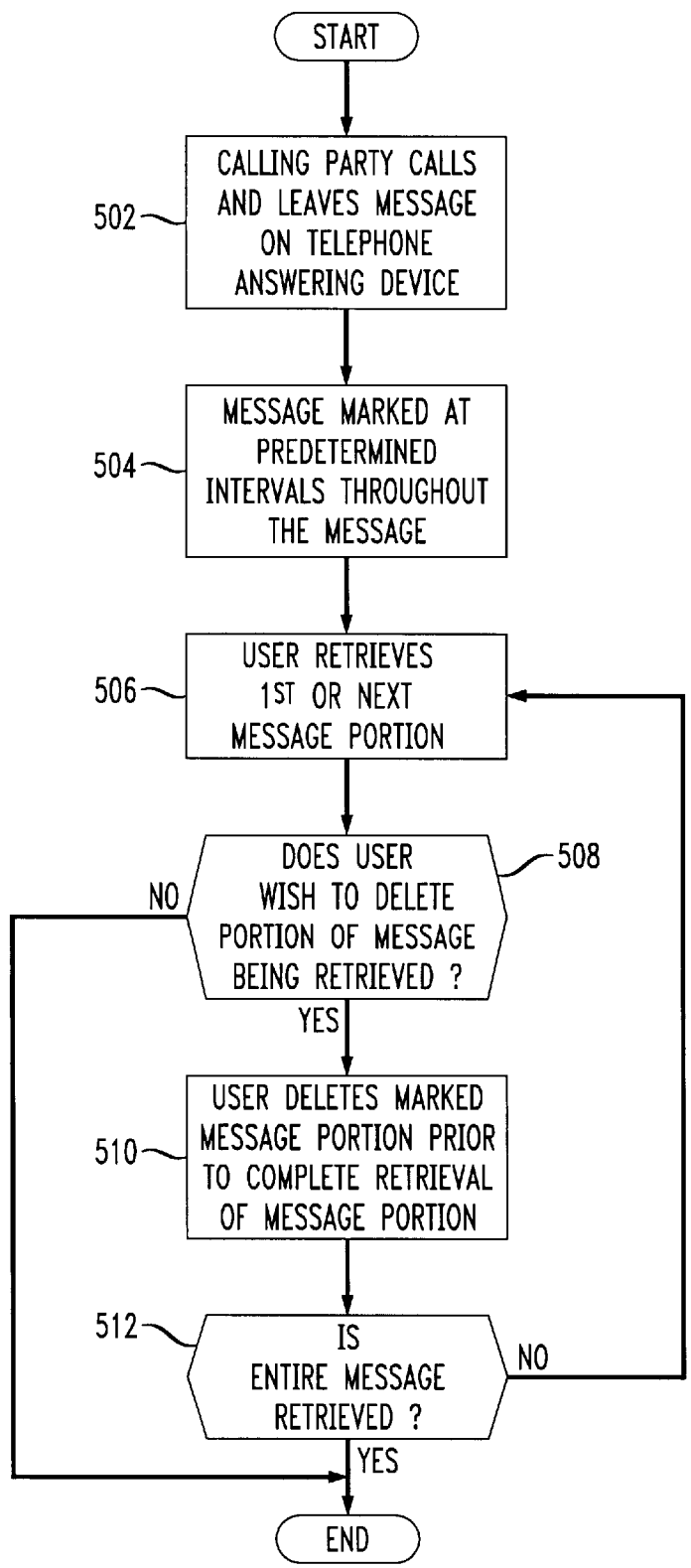
FIG. 5 is a flow chart illustrating an exemplary process by which the telephone answering device of FIG. 1, in accordance with the principles of the present invention, allows a user to delete only portions of a voice message while playing back the relevant voice message.
Figure 6:
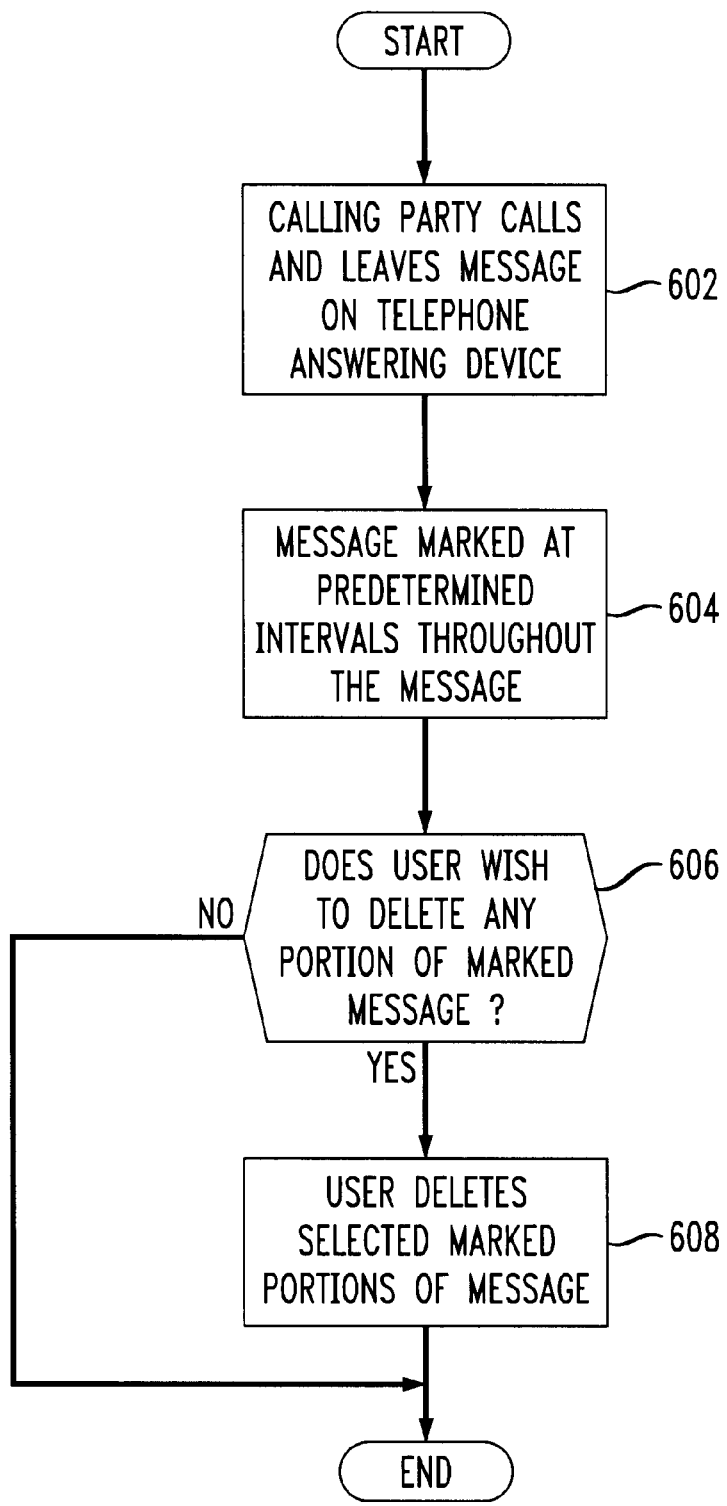
FIG. 6 is a flow chart illustrating an exemplary process by which the telephone answering device of FIG. 1, in accordance with the principles of the present invention, allows a user to delete only portions of a voice message prior to playback of any of the relevant voice message.
Figure 7:
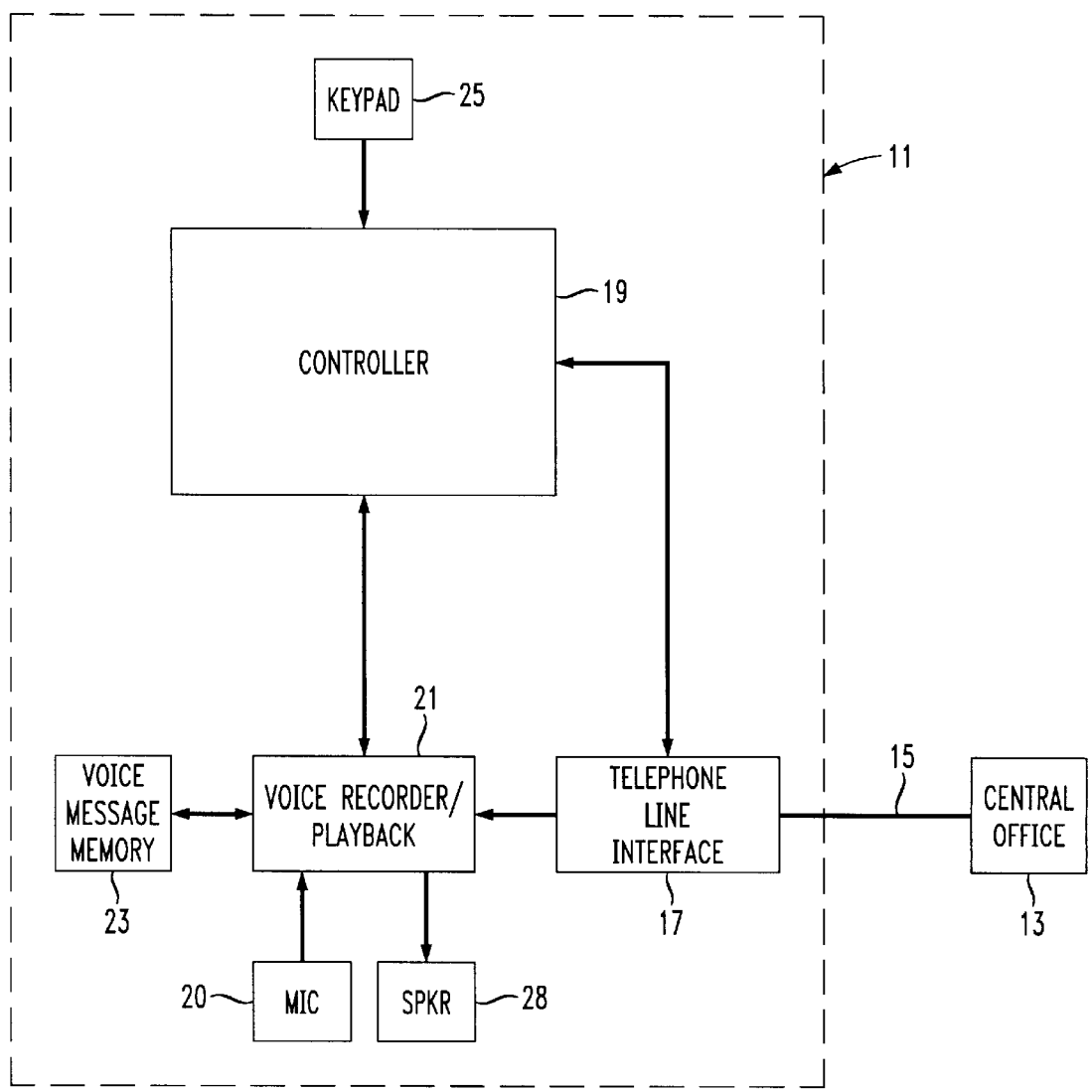
FIG. 7 illustrates a conventional telephone answering device.

FIGS. 3–6 illustrate various flow charts showing exemplary processes by which the telephone answering device 10 of FIG. 1 allows a user to selectively delete marked passages of a recorded voice message retrieved from the voice message memory 22. In particular, FIG. 3 illustrates an exemplary process of selectively deleting marked portions of a recorded voice message after a user has played back the entire recorded voice message, FIG. 4 illustrates an exemplary process of selectively deleting marked portions of a recorded voice message after the user has played back a particularly marked portion of a voice message, FIG. 5 illustrates an exemplary process of selectively deleting marked portions of a voice message while the user is playing back the particularly marked portion of the recorded voice message, and FIG. 6 illustrates an exemplary process of selectively deleting marked portions of a recorded voice message before the user has played back the particularly marked portion of the voice message.

With reference to FIG. 3, in step 302, a calling party calls and leaves a voice message on the telephone answering device 10. Prior to leaving a voice message, upon a predetermined number of rings, the telephone answering device 10 answers and plays an outgoing message such as "I'm not available right now, please leave a message" or other similar greeting.

In step 304, the timed marker module marks the voice message of the calling party at predetermined passage intervals throughout the voice message.

In step 306, the user plays back the entire voice message of the calling party retrieved from the voice message memory 22.

In decision step 308, the user determines whether or not to delete certain marked passages of the voice message.

If yes, in step 310, the user deletes those marked passages of the voice message by inputting the numbers of the marked passages together with a delete instruction. Such input can be input to the controller 24, e.g., using the keypad 26 (or from the alphanumeric keypad of a remote telephone used by the remote user when calling in to the telephone answering device for messages). For instance, if at the end of a very long voice message, a calling party finally provides their contact telephone number, the user may determine that the contact telephone number is in the last marked passage, or last two marked passages, of a particular recorded voice message. The user may then determine the identity of the portions to be deleted by determining the total number of marked passages comprised in the recorded voice message, e.g., as displayed on the marker display 34 (e.g., twenty-three (23)), subtract the approximation of, e.g., two (2), and then instruct the telephone answering device 10 to delete the first twenty-one (21) marked portions of the recorded voice message.

Any suitable instruction code to provide the controller and the selective deletion/save voice message module with the numbers of the marked portions of a recorded voice message to be deleted or archivally saved may be used, e.g., "#", "1", "*", "2", "1", wherein "#" on the keypad means delete, "1" means the first marked passage, means "through", and "2", "1" means through the twenty-first passage. Of course, as illustrated in FIG. 1, a dedicated "delete" key 36 and a dedicated "through" key 38 may be included on the keypad 26 or other area of the telephone answering device 10.

FIG. 4 shows that the marked portions of a recorded voice message can be deleted after the user has heard the relevant portion.

With reference to FIG. 4, in step 402, a calling party calls and leaves a voice message on the telephone answering device 10.

In step 404, the timed marker module 30, which outputs audible beeps through the speaker 28 and/or displays visible markers (e.g., portion numbers) on the marker display 34, marks portions of the recorded voice message at predetermined, intermittent, or random intervals throughout the recorded voice message.

In step 406, the user first plays back the first or next marked passage of the voice message of the calling party from the voice message memory 22.

In decision step 408, the user determines whether or not to delete the just-played marked portion of the voice message.

If yes, in step 410, the user deletes the current portion of the voice message by inputting the appropriate command(s) into the keypad 26 or other device to appropriately instruct the selective deletion voice message module 32. Once again, any suitable instruction code to provide the controller and/or the selective deletion voice message module 32 with the identity of the currently played portion of the recorded voice message may be used.

In decision step 412, it is determined whether the entire recorded voice message has been played back by the user. If not, the process returns to step 406 for continuation to playback the next marked portion of the recorded voice message.

FIG. 5 shows that the marked portions of a recorded voice message can be deleted while the user is playing back the relevant portion of the recorded voice message at issue.

In particular, with reference to FIG. 5, in step 502, a calling party calls and leaves a voice message on the telephone answering device 10.

In step 504, the timed marker module 30 marks the voice message in accordance with the principles of the present invention.

In step 506, the user plays back the first or next marked portion of the voice message from the calling party recorded and stored in the voice message memory 22.

In decision step 508, the user determines whether or not to delete the marked portion of the voice message being retrieved.

If yes, in step 510, the user deletes the marked portion of the recorded voice message currently being played, and the playback immediately advances to the next undeleted marked portion of the recorded voice message.

In decision step 512, it is determined whether or not the entire recorded voice message has been played back by the user. If not, the playback returns to step 506 for the user to advance to the next marked portion of the recorded voice message.

FIG. 6 shows that the marked portions of a recorded voice message can be detected even before being played back.

In particular, with reference to FIG. 6, in step 602, a calling party calls and leaves a voice message on the telephone answering device 10.

In step 604, the timed marker module 30 marks portions of the voice message of the calling party at predetermined intervals throughout the voice message 22 as it is recorded. The identity of particular memory sectors contained in any one marked portion of the recorded voice message can be included in appropriate header information with respect to the relevant voice data forming the recorded voice message stored in the voice message memory 22.

In decision step 606, the user determines whether or not to delete any of the marked portions of the voice message, even before playback of the same.

If yes, in step 608, the user deletes the desired portions of the voice message by appropriate input to the selective deletion voice message module 32.

The selective deletion can occur additively over a plurality of playback sessions. For instance, a user can repeatedly play back a particular recorded voice message, and delete any remaining delineated portions during each playback.

The principles of the present invention can be practiced by a calling party leaving a voice message on a telephone answering device or other voice messaging system. For instance, a calling party can be provided with equally-timed, audible markers (e.g., "beeps" or spoken partition numbers such as "twenty three"), and after leaving a voice message, may be prompted by a controller of the telephone answering device to input the partition numbers of any portion they would like to delete. In this case, a conventional key such as the pound "#" key can be used as a "delete portion" command. In response, the selective deletion voice message module 32 can update the header information relating to the stored voice message to effectively delete the requested portions.

References to the selective deletion of portions of voice messages throughout the disclosure of this specification relate equally to the saving of desired portions, thus recorded voice messages are acted upon to either save or delete selected portions. Accordingly, instead of or in addition to designating portions for deletion, the specific embodiment can prompt for input for designated portions of a voice message to be saved.

While the invention has been described with reference to the exemplary embodiments thereof, those skilled in the art will be able to make various modifications to the described embodiments of the invention. without departing from the true spirit and scope of the invention.

What is claimed is:

1. A telephone answering device which enables a user to select portions of a voice message, comprising:

a marker module adapted to delineate a recorded voice message into a plurality of timed portions; and a selective deletion/save voice message module adapted to act upon a delineated timed portion of said recorded voice message to reduce a playback length of said recorded voice message.

2. The telephone answering device which enables a user to select portions of a voice message according to claim 1, wherein:

said selective deletion/save voice message module updates an indexing of said recorded voice message to eliminate memory sectors containing voice data regarding deleted portions of said recorded voice message.

3. The telephone answering device which enables a user to select portions of a voice message according to claim 1, wherein:

said marker module delineates said recorded voice message into periodically timed portions.

4. The telephone answering device which enables a user to select portions of a voice message according to claim 1, wherein:

said marker module delineates said recorded voice message into intermittently timed portions.

5. The telephone answering device which enables a user to select portions of a voice message according to claim 1, wherein:

said marker module delineates said recorded voice message into randomly timed portions.

6. The telephone answering device which enables a user to select portions of a voice message according to claim 1, further comprising:

a keypad to cause deletion of a plurality of said delineated timed portions of said recorded voice message.

7. The telephone answering device which enables a user to select portions of a voice message according to claim 6, wherein:

said control element is a dedicated button.

8. The telephone answering device which enables a user to select portions of a voice message according to claim 6, wherein:

said deleted plurality of delineated timed portions relate to a beginning passage of said recorded voice message.

9. The telephone answering device which enables a user to select portions of a voice message according to claim 6, wherein:

said deleted plurality of delineated timed portions relate to an ending passage of said recorded voice message.

10. The telephone answering device which enables a user to select portions of a voice message according to claim 1, further comprising:

a control element to cause deletion of a currently played delineated timed portion of said recorded voice message.

11. A method of enabling selective deletion or saving of only a portion of a recorded voice message in a telephone answering device, comprising:

delineating a recorded voice message into a plurality of timed portions; and acting upon a delineated timed portion of said recorded voice message to shorten a playback length of said recorded voice message.

12. The method of enabling selective deletion or saving of only a portion of a recorded voice message in a telephone answering device according to claim 11, further comprising:

playing back said recorded voice message without playback of deleted timed portions of said recorded voice message.

13. The method of enabling selective deletion or saving of only a portion of a recorded voice message in a telephone answering device according to claim 11, further comprising:

revising header information relating to said recorded voice message to include information regarding placement of said delineations.

14. The method of enabling selective deletion or saving of only a portion of a recorded voice message in a telephone answering device according to claim 11, further comprising:

updating an indexing of said recorded voice message to eliminate memory sectors containing voice data regarding said deleted at least one of deleting and saving one but not all timed portions of said recorded voice message.

15. The method of enabling selective deletion or saving of only a portion of a recorded voice message in a telephone answering device according to claim 11, wherein:

said delineation delineates said recorded voice message into periodically timed portions.

16. The method of enabling selective deletion or saving of only a portion of a recorded voice message in a telephone answering device according to claim 11, wherein:

said delineation delineates said recorded voice message into intermittently timed portions.

17. Apparatus for enabling selective deletion or saving of only a portion of a recorded voice message in a telephone answering device, comprising:

means for delineating a recorded voice message into a plurality of timed portions; and means for at least one of deleting and saving at least one but not all of said plurality of timed portions of said recorded voice message.

18. The apparatus for enabling selective deletion or saving of only a portion of a recorded voice message in a telephone answering device according to claim 17, further comprising:

means for playing back said recorded voice message without playback of deleted and unsaved portions of said recorded voice message.

19. The apparatus for enabling selective deletion or saving of only a portion of a recorded voice message in a telephone answering device according to claim 17, further comprising:

means for updating an indexing of said recorded voice message to eliminate memory sectors containing voice data regarding said deleted or saved at least one but not all timed portions of said recorded voice message.

20. The apparatus for enabling selective deletion or saving of only a portion of a recorded voice message in a telephone answering device according to claim 17, wherein:

said delineation delineates said recorded voice message into periodically timed portions.

21. The apparatus for enabling selective deletion or saving of only a portion of a recorded voice message in a telephone answering device according to claim 17, wherein:

said delineation delineates said recorded voice message into intermittently timed portions.

* * * * *